May 18, 1954     R. M. OTIS ET AL     2,679,028
AMPLITUDE MODULATION MEASURING CIRCUIT
Filed June 26, 1950

RUSSELL M. OTIS
ARTHUR M. VIGILANTE
INVENTORS

BY Lyle Dillon
ATTORNEY

Patented May 18, 1954

2,679,028

UNITED STATES PATENT OFFICE 2,679,028

AMPLITUDE MODULATION MEASURING CIRCUIT

Russell M. Otis, Pasadena, and Arthur M. Vigilante, Malibu, Calif., assignors to Lane-Wells Company, Los Angeles, Calif., a corporation of Delaware Application June 26, 1950, Serial No. 170,386

9 Claims. (Cl. 324—111)

This invention relates to measuring circuits and more particularly to a method and apparatus adapted to measure an amplitude-modulated carrier signal.

The method and apparatus of this invention is particularly applicable to the measurement of an amplitude-modulated carrier signal where the amplitude of the carrier signal varies from extremely low values and over a wide range, where the frequencies of such modulation are very low and where it is important that such measurement be linear with respect to the amplitude of such modulated carrier.

A measuring system of the type of this invention is by way of example, particularly useful under conditions where wide variations in the amount or intensity of a light of low intensity is required to be measured, as in a spectrometer. Here, the light to be measured may be periodically chopped or interrupted by a rotating shutter device, as is well known in the art, to produce a light beam of a periodically varying quantity of light which is permitted to impinge upon a photocell to produce thereby an electric signal of corresponding frequency and amplitude, which in turn may be considered as a carrier signal or wave. This carrier will also have superposed upon it an amplitude modulation having a form corresponding with any change in the intensity or quantity of the light forming the interrupted beam. The resulting carrier signal may then be amplified to produce an amplified modulated carrier signal which may be measured by suitable metering or recording means.

In a spectrometer the amount of light passing through the rotating shutter device and reaching the photoelectric cell may be slowly varied by selectively scanning the spectrum so that the quantity of the periodically interrupted light is varied relatively slowly over a large number of cycles of the resultant carrier as the scanning device passes over individual spectrum lines. Thus the peak amplitude of the modulated carrier may vary, slowly from zero to a relatively large value. Under these circumstances the modulated carrier is similar in character to that produced by a controlled carrier system of modulation in which the carrier is caused to fall to zero in the absence of any modulation signal. In the application of this invention to use in connection with a spectrometer, as hereinbefore mentioned, it is desirable to measure the changing amplitude of the carrier with a circuit having a time constant which is long compared to the period of an individual cycle of the carrier, so as to measure only the amplitude of the carrier which, in the case of the spectrometer, will represent the spectrum being scanned. Because there are often extraneous disturbances, or so-called noise accompanying such measurements, it is usually desirable to employ measuring circuits having large time constants suitable for the period of modulation and which may be, for example, from several seconds to a minute or more. It is also desirable to have the time constant of such circuits easily variable without disturbing the other characteristics of the measuring circuit as to validity and linearity.

The attainment of large time constants of the order of from several seconds to one minute or more in connection with measuring circuits of the type of this invention have heretofore presented difficulties by reason of the impracticably large values of the circuit components required. Another difficulty usually encountered is that of achieving linearity and validity of the amplitude measurements over a wide range of time constants. This particularly applies to circuits employing transformers which are generally non-linear for very small currents. Another difficulty hereinbefore encountered resides in the provision of a suitable input circuit adapted to receive the output from the amplifier and transfer it to the input of a self-balancing potentiometer type of recorder which it usually employed.

It is accordingly an object of this invention to provide means for measuring the amplitude of a modulated carrier signal where the frequency of modulation is extremely low relative to the carrier frequency.

It is another object of this invention to provide means for measurement of the amplitude of the modulated carrier signal where the frequency of modulation is low relative to the carrier signal and varies over a wide ratio of frequencies.

It is still another object of this invention to provide means for effecting a measurement which bears a linear relationship to the peak-to-peak amplitude of a modulated carrier signal where the frequency of modulation is low relative to the carrier signal and has a wide range ratio of frequencies.

It is another object of this invention to provide means for effecting measurements which are linear with respect to the entire range of the peak-to-peak amplitudes of a modulated carrier signal particularly including conditions where the amplitude of the carrier may become infinitesimally small, approaching zero.

It is a further object of this invention to provide a measuring circuit capable of accomplishing the foregoing objects and having a time constant which is long relative to the period of the carrier and variable without disturbing or altering the relationship between the actual and measured amplitude of the carrier signal.

It is a still further object of this invention to furnish an electrical circuit having a long time constant without the necessity of employing the large values of capacity and resistance usually required.

It is a still further object of this invention to provide an output circuit for receiving a modulated carrier signal and producing therefrom an output D.-C. voltage which varies in accordance with the degree of modulation of said carrier.

It is a still further object of this invention to provide an output circuit for receiving a modulated carrier signal and producing an output suitable for measurement by means of a self-balancing potentiometer type of measuring device.

Other objects, advantages and features of novelty will be evident hereinafter.

In the drawings which illustrates diagrammatically preferred embodiments of the invention:

Figure 1:
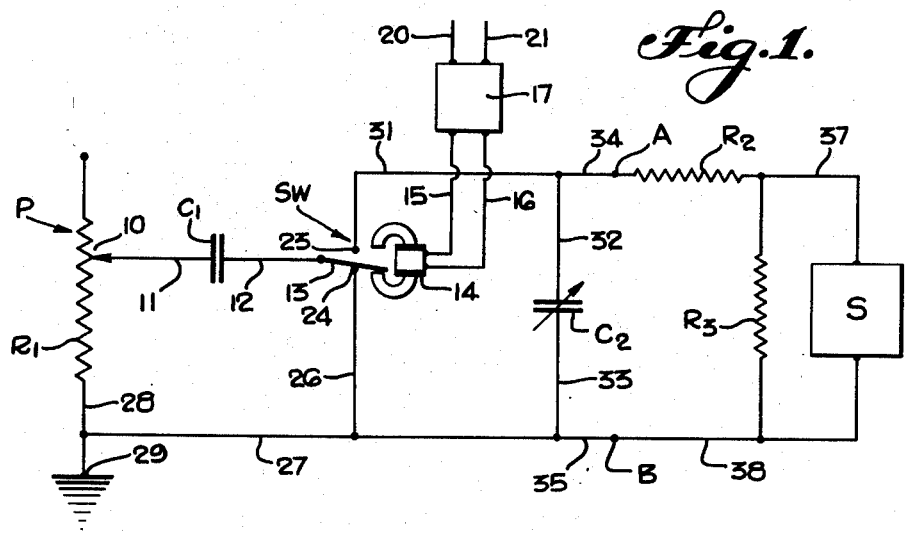
Figure 1 is a schematic diagram of the general arrangement of the apparatus.

The apparatus is as follows:

Referring primarily to Figure 1, P is a voltage divider resistor which may, for example, be in the cathode circuit of a cathode follower output stage of an amplifier (not shown) to which amplifier the modulated carrier current from a photocell may be applied for amplification, as briefly mentioned hereinbefore in connection with use of this invention with a spectrometer. An adjustable tap 10 makes connection with the resistor P at a suitable point and is connected through conductor 11 to one side of a capacitor $C_1$. The other side of the capacitor $C_1$ is connected through conductor 12 to a suitable switching means $Sw$. Switching means which may be suitable in this connection are of various types but preferably should be a mechanical switching device such as a commutator, polarized vibrating relay or the like electrically actuated switching mechanism which has bidirectional conductivity between the desired elements thereof during each of its conducting periods.

In the present case a polarized vibrating relay or electromagnetic switching device is employed as illustrated at $Sw$, and the conductor 12 makes connection with the armature or vibrating switching element 13 thereof. A field coil 14 of the switching device $Sw$ is connected through conductors 15 and 16, through an adjustable phase shifting means 17 and conductors 20 and 21 to a suitable source of alternating current as hereinafter more fully described.

The electromagnetic switching device $Sw$ is provided with a pair of contact points 23 and 24 positioned on opposite sides of the armature 13 and with which the armature 13 is adapted to make alternating contact as it is swung from side to side under the influence of the alternating magnetic field from the field coil 14. Contact point 24 is connected through conductor 26 through a common ground bus 27 and thence to one end 28 of the voltage divider resistor P which may be grounded if desired at 29.

The opposite contact point 23 is connected through a conductor 31 and thence through conductor 32 to one side of a capacitor $C_2$ and the opposite side of capacitor $C_2$ is connected through conductor 33 to the beforementioned ground bus 27. The opposite sides of the capacitor $C_2$ are connected by way of conductors 32 and 33 and conductors 34 and 35, respectively, to a pair of output terminals A and B, respectively, to which suitable measuring or metering circuits and devices may be connected as hereinafter described.

Various measuring means may be employed but the means preferably employed, particularly in connection with apparatus such as the spectrometer hereinbefore referred to, is the self-balancing potentiometer type of recorder which is illustrated at S in Figure 1. One side of the self-balancing potentiometer S is connected to terminal A through resistor $R_2$ and conductor 37 and the other side is connected to terminal B through conductor 38. The self-balancing potentiometer S is preferably shunted by a resistor $R_3$.

The operation of the apparatus of Figure 1 is as follows:

If it is assumed, by way of example, that the resistor P is in the cathode circuit of a cathode follower stage of an amplifier and that the amplifier input is energized by an alternating carrier voltage of a given frequency and having a sine wave voltage form and that this alternating carrier voltage is modulated in accordance with a phenomenon which it is desired to measure, the modulation being relatively slow or at a relatively low frequency as compared to the frequency of the carrier, then the resistor P will carry a pulsating current comprising a direct current with an A.-C. component, the A.-C. component of which is similar in form and having an amplitude which varies in accordance with the modulation applied to the amplifier input. It is the amplitude of the modulated carrier present across the resistor P which it is desired to measure.

The magnetic switching device $Sw$ is operated at a frequency equal to that of the beforementioned carrier signal frequency and at a fixed phase relationship thereto, and this is accomplished by energizing the field coil 14 by an alternating current having the same frequency as the said carrier frequency. For this purpose conductors 20 and 21 may be connected to a suitable source of alternating current such as, for example, a generator which is run in synchronism with the generator of the before mentioned carrier signal. The generator of the said carrier signal may comprise apparatus such as the rotating shutter and photocell apparatus mentioned hereinbefore by way of example, and the generator of the beforementioned alternating current may, for example, be coupled to the shaft of the rotating shutter and thereby run in synchronism therewith and at a fixed phase relationship therewith. The alternating current thus generated and applied at conductors 20 and 21 passes through the adjustable phase shifting network 17 and thence through conductors 15 and 16 to the field winding 14 of the magnetic switching device $Sw$. In operation the phase shifting network 17 is adjusted or the coupling between the beforementioned alternating current and carrier signal generators is adjusted such that the polarized armature 13 of the magnetic switching device $Sw$ is caused to move back and forth between the contacts 23 and 24 in synchronism with the reversing excitation of the field coil 14 and in such phase relationship therewith that the armature 13 preferably leaves the contacts 23 and 24 respectively at or close to the times corresponding to the peaks of opposite polarity of the carrier potential wave.

The phase of this switching action can be determined and proper adjustments accordingly be made by means of an oscillograph connected across the resistance $R_1$. Pips will be observed to occur on the trace of the alternating signal voltage appearing on the oscilloscope screen at the times switching occurs.

The tap 10 on the resistor P is adjusted to a point to provide a suitable resistance $R_1$ between the tap 10 and the ground connection 28 constituting, in effect, a source of and to supply a suitable voltage input to the circuit between conductors 11 and 27. When the armature 13 is in contact with contact 24 the capacitor $C_1$ is placed in parallel with resistance $R_1$ between the adjustable contact 10 and conductor 28 and is charged to a potential equal to that appearing across resistance $R_1$ by way of conductors 11, 27, 26 and 12. When the armature 13 is in contact with contact 23, the condensers $C_1$ and $C_2$ are placed in series across the resistance $R_1$ by way of conductors 11, 27, 33, 32, 31, and 12.

At the times when the armature 13 makes contact with 23 to place the condensers $C_1$ and $C_2$ in series as beforedescribed, the wave of the carrier potential appearing across the resistance $R_1$ is 180° out of phase with that which it has at the times when the armature 13 makes contact with 24 to charge condenser $C_1$. Thus the total potential available for charging $C_2$ is the potential appearing across resistance $R_1$ plus that appearing across capacitor $C_1$ which is equal to two times the peak potential of the carrier.

Each time the armature 13 makes contact at 23 the charge in capacitor $C_1$ is shared with capacitor $C_2$ and after a period of time during which the carrier may be maintained at a substantially constant amplitude, condenser $C_2$ is brought up to its maximum potential which as beforestated is two times the peak carrier potential appearing across the resistance $R_1$.

The operation of the circuit may be further illustrated by first considering what occurs when after measuring a substantially constant amplitude of the carrier voltage as beforedescribed, which results in a constant D.-C. voltage across the capacitor $C_2$, the amplitude of the carrier voltage across the voltage divider P drops to a substantially lower value. Under such conditions, when the armature 13 of the switching device $Sw$ makes contact at 24, capacitor $C_1$ discharges through the resistance $R_1$ until its voltage is equal to that of the new substantially reduced potential appearing thereacross. Following this, when the armature 13 of the switching device $Sw$ swings into contact with contact 23, the capacitor $C_2$ is thereby, in effect, connected in parallel with capacitor $C_1$ through the resistance $R_1$ and transfers and shares its charge with capacitor $C_1$. Then, on the subsequent cycle of operation the armature 13 again swings into contact with contact point 24 and the capacitor $C_1$ again discharges itself through the resistance $R_1$ until the potential across it is again equal to that of the reduced value appearing across resistance $R_1$. The time constant $R_1C_1$ of the circuit including the capacitor $C_1$, conductors 11, 12, armature 13, conductors 26, 27 and resistance $R_1$, is made small enough so that before the armature 13 leaves contact 24 there results substantially complete discharge of the capacitor $C_1$ down to the voltage appearing across resistance $R_1$, which voltage may under some conditions actually fall to zero. Following this the armature 13 then again swings into contact with contact point 23 whereupon capacitor $C_2$ again shares a portion of its remaining charge with capacitor $C_1$, and this cycle of operations is repeated in rapid succession at a frequency equal to the carrier frequency until the increments of charge thus transferred from the capacitor $C_2$ by means of the capacitor $C_1$ has reduced the potential across the capacitor $C_2$ to the potential appearing at that instant across the resistance $R_1$. The proportion by which the potential across capacitor $C_2$ is reduced at each such charge-transferring event is dependent upon the ratio of the capacity of the capacitor $C_1$ to that of capacitor $C_2$, the proportional reduction in voltage of capacitor $C_2$ being less as the ratio of the capacity of $C_2$ to that of $C_1$ is increased. Since the switching device $Sw$ is actuated at a constant number of times per second and, in the present example at the carrier frequency, the number of times per second the capacitor $C_2$ shares its charge with capacitor $C_1$ is constant over a given period of time. Since at each such sharing event there is a proportionate reduction in the potential across capacitor $C_2$ this voltage is reduced by a substantially constant proportion of itself for each unit of time thereby making the character of the reduction of voltage with respect to time substantially exponential, or in other words, similar to that obtained were the capacitor $C_2$ to be discharged through a resistor.

As beforestated, the effective time constant of the discharge of capacitor $C_2$ may be adjusted by varying the ratio of the capacity of capacitor $C_1$ to that of capacitor $C_2$. In varying the time constant it has been found preferable to leave capacitor $C_1$ at a constant value and vary the capacity of capacitor $C_2$. This variation may be conveniently accomplished by switching additional capacitors into or out of parallel relation with capacitor $C_2$. Thus, increasing the value of the capacity of $C_2$ while holding the capacity of $C_1$ constant results in an increase in the time constant of the circuit, the time constant being as beforestated, substantially proportional to the ratio of the capacity of $C_2$ to that of $C_1$ when $C_2$ is large compared to $C_1$.

In continuance of the illustration of the operation of this circuit it may next be assumed that while the capacitor $C_2$ is under a condition of reduced potential resulting from the operation of the circuit as hereinbefore described, the amplitude of the carrier signal appearing across resistance $R_1$ suddenly increases to a substantially higher value. Under this condition, the action of the circuit is the reverse of that hereinbefore described which caused the discharge of the capacitor $C_2$. Under the latter condition when the armature 13 of the switching device $Sw$ moves to the contact 24, the capacitor $C_1$ is connected by way of conductors 11, 12, 26 and 27 across resistance $R_1$ and is thereby charged to a potential corresponding to the increased potential appearing across resistance $R_1$. At a time corresponding to the next half-cycle of the carrier the relay armature 13 moves to contact 23 under which condition the increased charge previously introduced into the capacitor $C_1$ is shared with the capacitor $C_2$ by way of conductors 31, 32 and return through conductors 33 and 27. At each such cycle of operation of the switching device $Sw$, an additional increment of the charge introduced into capacitor $C_1$ is shared with the capacitor $C_2$ and the capacitor $C_2$ is thereby progressively charged at a rate proportional to the difference in voltages involved and, therefore, as the voltage of capacitor $C_2$ is thus increased, the rate at which the capacitor $C_2$ is charged becomes less and less until its voltage finally reaches the voltage available for charging it. Here again since at each such potential-transferring event there is a proportionate increase in the voltage across capacitor $C_2$, this voltage is increased by a substantially constant proportion for each unit of time, thereby making the character of the increase of potential across the capacitor $C_2$ similar to that which would be obtained were the capacitor charged through a resistor.

Each time the armature 13 moves into contact with contact 23 the potential appearing across the resistance $R_1$, corresponds to that portion of the carrier wave which is 180° out of phase with that portion thereof appearing across the resistance $R_1$ when the armature 13 moves into contact with contact 24, and is therefore equal to but opposite in polarity to the voltage previously imposed upon the capacitor $C_1$. The voltage applied across capacitor $C_1$ can therefore add to the voltage appearing across the resistance $R_1$ to provide a maximum charging voltage for the capacitor $C_2$ equal to twice the peak voltage of the carrier voltage appearing across the resistance $R_1$. Thus in operation the D.-C. voltage across the capacitor $C_2$ will, depending upon the effective time constant of the circuit in all cases, reach a value approximately equal to twice the peak value of the carrier or, in other words, equal to the peak-to-peak value of the modulated carrier voltage appearing across the resistor $R_1$.

An important feature of this invention resides in the fact that any direct current component through the resistance $R_1$ has substantially no effect upon the voltage appearing across the capacitor $C_2$. This fact may be illustrated by considering, for convenience of illustration, that the carrier amplitude is zero and only D.-C. current is flowing through the resistance $R_1$. Then when the relay armature moves to contact 24 the capacitor $C_1$ is charged to a potential difference equal to the D.-C. voltage appearing across the resistance $R_1$. When the armature 13 leaves the contact 24 the capacitor $C_1$ remains charged to this same potential difference and when the armature 13 moves to contact 23 the capicator $C_1$ is placed in series relation with the resistance $R_1$ insofar as these elements constitute a charging circuit for the capacitor $C_2$. In this relation the potential difference to which $C_1$ was previously charged is equal and opposite to the potential difference across resistor $R_1$, resulting in zero voltage available for charging capacitor $C_2$.

Since the change in charge of the capacitor $C_2$ occurs in small steps at the carrier frequency as hereinbefore described, when a self-balancing potentiometer is employed to measure the voltage across the capacitor $C_2$ it is found that the indicator or recording pen of the self-balancing potentiometer mesuring instrument tends to chatter or to move by corresponding small jumps. It has been discovered that this tendency may be reduced by placing a resistance $R_2$ in series with the self-balancing potentiometer. It has been found that this resistance is preferably approximately equal to the input impedance of the self-balancing potentiometer. While additional stages of RC filtering may be added between the resistance $R_2$ and the input of the self-balancing potentiometer, we have found that the preferred value of the single resistance $R_2$ is sufficiently large to satisfactorily damp out the objectionable vibration of the instrument indicator mechanism.

However, when a sufficiently high resistance at $R_2$ is employed to accomplish the beforementioned damping out of the vibration of the instrument indicator, it has been found to have the disadvantage of causing the recording mechanism thereof to fail to move completely to a position corresponding to the null or balanced condition of the potentiometer. The reason for this is that a self-balancing potentiometer requires at its input at least a certain threshold value of off-balance voltage or current to cause or to sustain its movement. The required threshold current passing through the resistance $R_2$ produces a voltage drop therein, and in the case where the voltage of capacitor $C_2$ is greater than the counter voltage of the self-balancing potentiometer this voltage drop through $R_2$ results in a voltage across the self-balancing potentiometer less than that across the capacitor $C_2$. As a consequence of this, when the self-balancing potentiometer is approaching balance from a voltage, for example, lower than the voltage across $C_2$, a condition is eventually reached where the difference in voltage across the capacitor $C_2$ and the counter voltage produced by the self-balancing potentiometer just equals the voltage drop across the resistance $R_2$ for a current therethrough equal to the threshold current of the device. At this point the motion of the self-balancing potentiometer mechanism will stop at a point short of the point of balance to which it would move if it reached a point where its counter potential corresponded exactly to the voltage of capacitor $C_2$. On the other hand, when the counter voltage produced by the self-balancing potentiometer is greater than the voltage of capacitor $C_2$ and the self-balancing potentiometer is approaching its point of equilibrium or balance on the upper side, a similar situation is eventually reached where the recording mechanism of the self-balancing potentiometer will stop short of the point corresponding to the voltage of the capacitor $C_2$, and in this instance, it will stop on the upper side of the point of balance. Thus the null or balance point of the self-balancing potentiometer is widened by the presence of the resistor $R_2$ and becomes wider as this resistance is increased in value.

To overcome the foregoing difficulty, it has been found desirable to provide a resistance $R_3$ shunting the self-balancing potentiometer. The resistance $R_3$ is preferably lower than the impedance of the self-balancing potentiometer and is of a value low enough to provide a current through the resistance $R_3$ which is large compared to the threshold current required to be passed through the self-balancing potentiometer in order to make it move. Under this arrangement the voltage appearing across the self-balancing potentiometer and across the resistor $R_3$ bears a substantially constant relation to the potential across capacitor $C_2$ and is substantially proportional to it regardless of the direction of the relatively small current entering or leaving the self-balancing potentiometer. This results in an action providing practically only one point of balance for the self-balancing potentiometer, corresponding to a particular voltage across the capacitor $C_2$. While the value of the resistance $R_3$ is required to be low enough to pass a current large compared to that of the threshold current for the self-balancing potentiometer, the value of resistance $R_3$ is preferably made as large as possible consistent with this condition in order that the voltage appearing across resistance $R_3$ shall be as large a portion as possible of that appearing across the capacitor $C_2$. It has been found satisfactory to meet these required conditions, to make the resistance $R_3$ about one half of that of the resistance $R_2$.

The values of $C_2$ and $R_2$ preferably should be such that the time constant of the circuit including $R_2$ and $C_2$ is large relative to the time constant resulting from the switching of the magnetic switching device $Sw$ and determined by the ratio of $C_2$ to $C_1$.

Typical values of the constants of the various elements of the circuit of this invention which have been found to be satisfactory in the operation of the invention as herein illustrated are as follows:

Carrier frequency=15 cycles per second.
$R_1$=85 to 650 ohms.
$R_2$=10,000 ohms.
$R_3$=5,000 ohms.
$C_1$=6 mfd.
$C_2$=120 to 1920 mfd.

A self-balancing potentiometer which has proved satisfactory in connection with the apparatus and circuit hereinbefore described is the Brown Electronik Strip Chart Potentiometer Model Y153X (12) V–X–(9) A(G)K(V), range −0.5 to +10.5 milliwatts, manufactured by Minneapolis Honeywell Regulator Co., Brown Instrument Division, Philadelphia, Pennsylvania. The input impedance of this self-balancing potentiometer is approximately 10,000 ohms.

Figure 2:
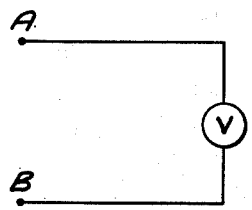
Figures 2, 3 and 4 are schematic illustrations of alternative modifications of a portion of the apparatus of Figure 1.
Figure 3:
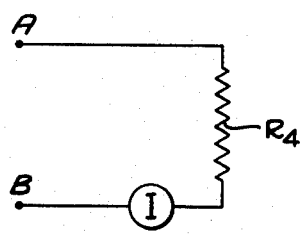
Figure 4:
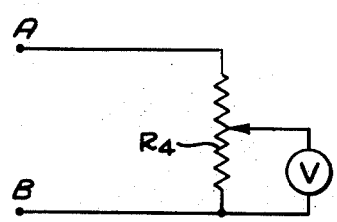

Referring now to Figures 2, 3 and 4, alternative measuring circuits and devices are therein illustrated which may, under some circumstances, be substituted for that portion of the circuit shown in Figure 1 beyond the terminals A and B. In Figure 2 a voltmeter, electroscope, electrometer or similar voltage measuring device V may be connected directly across the terminals A, B. A current measuring device I, placed in series with a resistance $R_4$ may be connected across the terminals A, B as illustrated in Figure 3, the current through I then being proportional to the voltage across A, B.

A voltage divider circuit may be employed in which the voltage measuring device V is connected across a portion of the whole resistance $R_4$ which is in turn connected across the terminals A and B.

As beforestated, the preferred measuring device is of the self-balancing potentiometer type as hereinbefore described and the arrangement thereof is a special case of that illustrated in Figure 4 in which a resistance $R_2$ is connected to a terminal point A while the other end of resistance $R_2$ is connected to a resistance $R_3$, the other end of which in turn is connected to the terminal point B. The self-balancing potentiometer S is then connected across the resistance $R_3$ which is equivalent to being connected across a portion of the resistance $R_4$ shown in Figure 4.

While, for convenience of illustration the apparatus of this invention has been described in connection with spectrometric apparatus, it is equally well suited for use where any other modulation characteristics or values of electric signals, currents or voltages of the type hereindescribed are required to be measured or recorded.

It is to be understood that the foregoing is illustrative only of a preferred embodiment and that the invention is not to be limited thereby but may include various modifications within the skill of the art without distinguishing from the scope of the invention as defined in the appended claims.

What is claimed is:

1. A measuring circuit for measuring the amplitude of an amplitude-modulated, alternating carrier signal component comprising: a first capacitor; a second capacitor; switching means for alternately bidirectionally conductively connecting said first capacitor across, and bidirectionally conductively connecting said first and second capacitors in series across, a source of such signal component to be measured; means to operate said switching means in synchronism with the frequency of said carrier signal component; and means to connect the said second capacitor across a unidirectional potential measuring device.

2. A measuring circuit for measuring the amplitude of an amplitude-modulated, alternating carrier signal component comprising: a first capacitor; a second capacitor; switching means for alternately bidirectionally conductively connecting said first capacitor across, and bidirectionally conductively connecting said first and second capacitors in series across, a source of such signal component to be measured; means to operate said switching means in synchronism with the frequency of said carrier signal component and in such phase relationship therewith as to disconnect said first capacitor from said source close to the time corresponding to the peak potential of one polarity and to connect said first and second capacitors across said source close to the time corresponding to the peak potential of the opposite polarity of said carrier signal; and means to connect the said second capacitor across a unidirectional potential measuring device.

3. A measuring circuit for measuring the amplitude of an amplitude-modulated, alternating carrier signal component comprising: a first capacitor; a second capacitor; switching means for alternately bidirectionally conductively connecting said first capacitor across, and bidirectionally conductively connecting said first and second capacitors in series across a source of such signal component to be measured; means to operate said switching means in synchronism with the frequency of said carrier signal component and at a substantially constant, predetermined phase relationship thereto; and means to connect the said second capacitor across a unidirectional potential measuring device.

4. A measuring circuit for measuring the amplitude of an amplitude-modulated, alternating carrier signal component comprising: a first capacitor; a second capacitor; switching means for alternately bidirectionally conductively connecting said first capacitor in parallel with a source of such signal component to be measured while disconnected from said second capacitor, and bidirectionally conductively connecting said first capacitor in series with said second capacitor and said source; and means to operate said switching means in synchronism with the frequency of said carrier signal component and at a substantially constant, predetermined phase relationship thereto; and means to connect the said second capacitor across a unidirectional potential measuring device.

5. A measuring circuit for measuring the amplitude of an amplitude-modulated, alternating carrier signal component comprising: a first capacitor; a second capacitor; switching means for alternately bidirectionally conductively connecting said first capacitor in parallel with a source of such signal component to be measured while disconnected from said second capacitor, and bidirectionally conductively connecting said first capacitor in series with said second capacitor; means to operate said switching means in synchronism with the frequency of said carrier signal component and at a substantially constant, predetermined phase relationship thereto; and means to connect the said second capacitor across a unidirectional potential measuring device.

6. Apparatus according to claim 5 in which said switching means is a mechanical switch.

7. Apparatus according to claim 3 in which the capacity of the second capacitor is large relative to the capacity of the first capacitor.

8. Apparatus according to claim 5 and a unidirectional potential measuring device comprising a self-balancing potentiometer across which said second capacitor is connected, and in which said means to connect said second capacitor across said self-balancing potentiometer comprises: conductors connecting opposite sides of said second capacitor to opposite input terminals of said self-balancing potentiometer; resistance means in series in at least one of said conductors; and resistance means connected in shunt to said input terminals.

9. Apparatus according to claim 8 in which said first mentioned resistance means has a resistance approximately equal to the input impedance of the said self-balancing potentiometer and in which said second mentioned resistance means has a resistance which is less than the input impedance of said self-balancing potentiometer.

References Cited in the file of this patent

UNITED STATES PATENTS

| Number | Name | Date |
| --- | --- | --- |
| 2,012,291 | Tuttle | Aug. 27, 1935 |
| 2,113,011 | White | Apr. 5, 1938 |
| 2,114,016 | Dimond | Apr. 12, 1938 |
| 2,199,757 | Rhode | May 7, 1940 |
| 2,375,159 | Wills | May 1, 1945 |
| 2,385,447 | Jones | Sept. 25, 1945 |
| 2,491,428 | Tellier | Dec. 13, 1949 |
| 2,511,562 | Bresee | June 13, 1950 |